(12) United States Patent
Torita et al.

(10) Patent No.: US 11,431,018 B2
(45) Date of Patent: Aug. 30, 2022

(54) NON-AQUEOUS ELECTROLYTE SECONDARY BATTERY

(71) Applicant: Toyota Jidosha Kabushiki Kaisha, Toyota (JP)

(72) Inventors: Koji Torita, Nagoya (JP); Hideaki Fujita, Kyotanabe (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 16/188,813

(22) Filed: Nov. 13, 2018

(65) Prior Publication Data

US 2019/0148762 A1 May 16, 2019

(30) Foreign Application Priority Data

Nov. 15, 2017 (JP) .............................. JP2017-219965

(51) Int. Cl.
| | |
|---|---|
| *H01M 10/05* | (2010.01) |
| *H01M 4/583* | (2010.01) |
| *H01M 4/485* | (2010.01) |
| *H01M 4/587* | (2010.01) |
| *H01M 4/36* | (2006.01) |
| *H01M 10/0525* | (2010.01) |
| *H01M 4/48* | (2010.01) |
| *H01M 50/40* | (2021.01) |

(Continued)

(52) U.S. Cl.
CPC ........... *H01M 10/05* (2013.01); *H01M 4/364* (2013.01); *H01M 4/48* (2013.01); *H01M 4/485* (2013.01); *H01M 4/583* (2013.01); *H01M 4/587* (2013.01); *H01M 10/0525* (2013.01); *H01M 50/40* (2021.01); *H01M 50/409* (2021.01); *H01M 2004/027* (2013.01)

(58) Field of Classification Search
CPC ............. H01M 10/05; H01M 2/14–16; H01M 2004/027; H01M 4/02–587
USPC ......................................................... 429/209
See application file for complete search history.

(56) References Cited

U.S. PATENT DOCUMENTS

2007/0048607 A1* 3/2007 Nakashima ....... H01M 10/0525
429/209
2011/0111280 A1 5/2011 Tamakoshi et al.
(Continued)

FOREIGN PATENT DOCUMENTS

| CN | 1934728 A | 3/2007 |
| CN | 104704669 A | 6/2015 |

(Continued)

*Primary Examiner* — Cynthia H Kelly
*Assistant Examiner* — Niara Trant
(74) *Attorney, Agent, or Firm* — Dinsmore & Shohl LLP (57) ABSTRACT

A non-aqueous electrolyte secondary battery includes at least a positive electrode active material layer, a porous film, and a negative electrode active material layer. The negative electrode active material layer contains at least a graphite-based carbon material and silicon oxide. The porous film is interposed between the positive electrode active material layer and the negative electrode active material layer. The porous film contains at least a ceramic material. The negative electrode active material layer has a first spring constant. The porous film has a second spring constant. A ratio of the second spring constant to the first spring constant is higher than 1.

15 Claims, 4 Drawing Sheets

(51) Int. Cl.
*H01M 50/409* (2021.01)
*H01M 4/02* (2006.01)

(56) References Cited

U.S. PATENT DOCUMENTS

| | | | |
|---|---|---|---|
| 2012/0009452 A1* | 1/2012 | Ueda | H01M 10/0525 |
| | | | 429/94 |
| 2014/0342238 A1 | 11/2014 | Lee et al. | |
| 2015/0188107 A1* | 7/2015 | Sugii | H01M 4/133 |
| | | | 429/145 |
| 2017/0338460 A1* | 11/2017 | Kim | C09J 7/30 |

FOREIGN PATENT DOCUMENTS

| | | |
|---|---|---|
| JP | 2013-131486 A | 7/2013 |
| KR | 1020110031476 A | 3/2011 |
| KR | 1020140040060 A | 4/2014 |

* cited by examiner

NON-AQUEOUS ELECTROLYTE SECONDARY BATTERY

CROSS-REFERENCE TO RELATED APPLICATIONS

This nonprovisional application claims priority to Japanese Patent Application No. 2017-219965 filed on Nov. 15, 2017 with the Japan Patent Office, the entire contents of which are hereby incorporated by reference.

BACKGROUND

Field

The present disclosure relates to a non-aqueous electrolyte secondary battery.

Description of the Background Art

Japanese Patent Laying-Open No. 2013-131486 discloses a negative electrode active material layer containing a graphite-based carbon material and silicon oxide.

SUMMARY

As negative electrode active materials of non-aqueous electrolyte secondary batteries, a graphite-based carbon material and silicon oxide are known. Silicon oxide can have a specific capacity (capacity per unit mass) higher than that of a graphite-based carbon material. When silicon oxide is used alone, its initial capacity is high but its cycle capacity retention is low. The reason is considered to be that silicon oxide changes its volume drastically during charge and discharge and, as a result, charge-discharge cycles (repeated charge and discharge) cause splitting of silicon oxide (particles) and deterioration of the electrode to proceed.

To solve this problem, research has been conducted on the use of silicon oxide mixed with a graphite-based carbon material in an attempt to attain initial capacity and cycling performance both at appropriate levels. In such a mixed system containing a graphite-based carbon material and silicon oxide, however, there is still a tendency that the degree of decrease in cycle capacity retention due to the inclusion of silicon oxide is great. Because of this reason, it is considered to be difficult to attain initial capacity and cycling performance both at appropriate levels.

An object of the present disclosure is to provide a non-aqueous electrolyte secondary battery that includes a graphite-based carbon material and silicon oxide as negative electrode active material. In this battery, the degree of decrease in cycle capacity retention is small even though silicon oxide is contained.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A non-aqueous electrolyte secondary battery according to the present disclosure includes at least a positive electrode active material layer, a porous film, and a negative electrode active material layer. The negative electrode active material layer contains at least a graphite-based carbon material and silicon oxide. The porous film is interposed between the positive electrode active material layer and the negative electrode active material layer. The porous film contains at least a ceramic material. The negative electrode active material layer has a first spring constant. The porous film has a second spring constant. A ratio of the second spring constant to the first spring constant is higher than 1.

Figure 1:
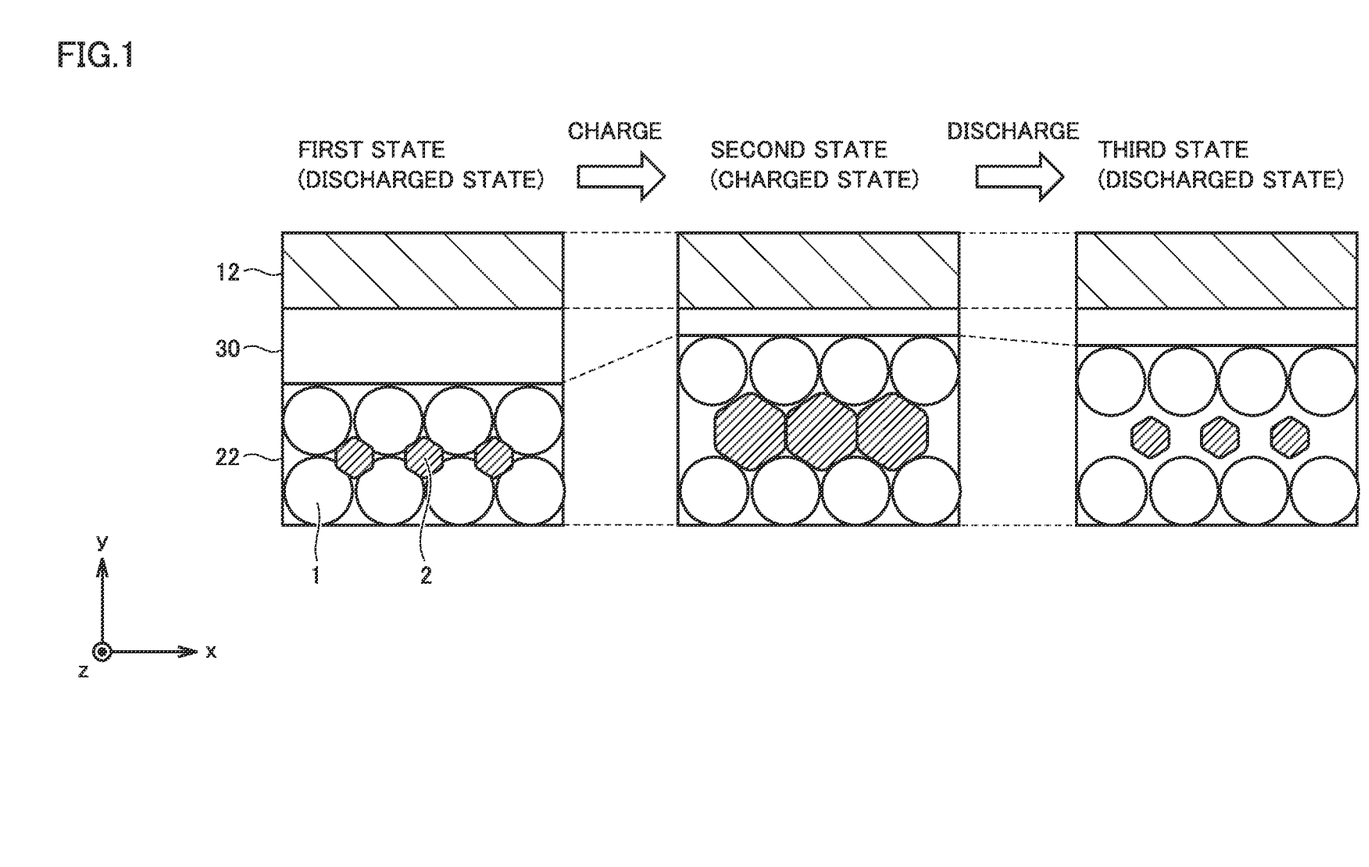
FIG. 1 is a first conceptual view that illustrates the action mechanism according to the present disclosure.

FIG. 1 is a first conceptual view that illustrates an action mechanism according to the present disclosure.

In the non-aqueous electrolyte secondary battery, a positive electrode active material layer 12 and a negative electrode active material layer 22 face each other with a porous film 30 interposed therebetween. Typically, porous film 30 consists of a polymer material (such as polyethylene). Porous film 30 is also called "separator".

Negative electrode active material layer 22 contains a graphite-based carbon material 1 and a silicon oxide 2. It is considered that in such a mixed system containing graphite-based carbon material 1 and silicon oxide 2, the degree of decrease in cycle capacity retention is great because silicon oxide 2 is contained, in which the decrease is attributable to the mechanism described below.

A first state in FIG. 1 refers to a discharged state. In the first state, graphite-based carbon material 1 and silicon oxide 2 are in electrical contact with each other. A second state in FIG. 1 refers to a charged state. Charge causes a drastic expansion of silicon oxide 2. The volume of silicon oxide 2 in the charged state can be about 2.5 times the volume of silicon oxide 2 in the discharged state. It is considered that the expansion of silicon oxide 2 causes an increase in the thickness of negative electrode active material layer 22. Porous film 30 in FIG. 1 consists of a polymer material, which is relatively soft. It is considered that because the porous film is relatively soft, the thickness of porous film 30 decreases as the thickness of negative electrode active material layer 22 increases.

A third state in FIG. 1 refers to a discharged state. Discharge causes a drastic shrinkage of silicon oxide 2. Here, it is considered that the once-increased thickness of negative electrode active material layer 22 does not return to the original thickness. It is considered that this phenomenon leads to breakage of the electrical contact between graphite-based carbon material 1 and silicon oxide 2. It is considered that after the breakage of the electrical contact with graphite-based carbon material 1, silicon oxide 2 can no longer be involved in charge and discharge. It is considered that these phenomena are responsible for a great degree of decrease in cycle capacity retention due to the inclusion of silicon oxide.

Figure 2:
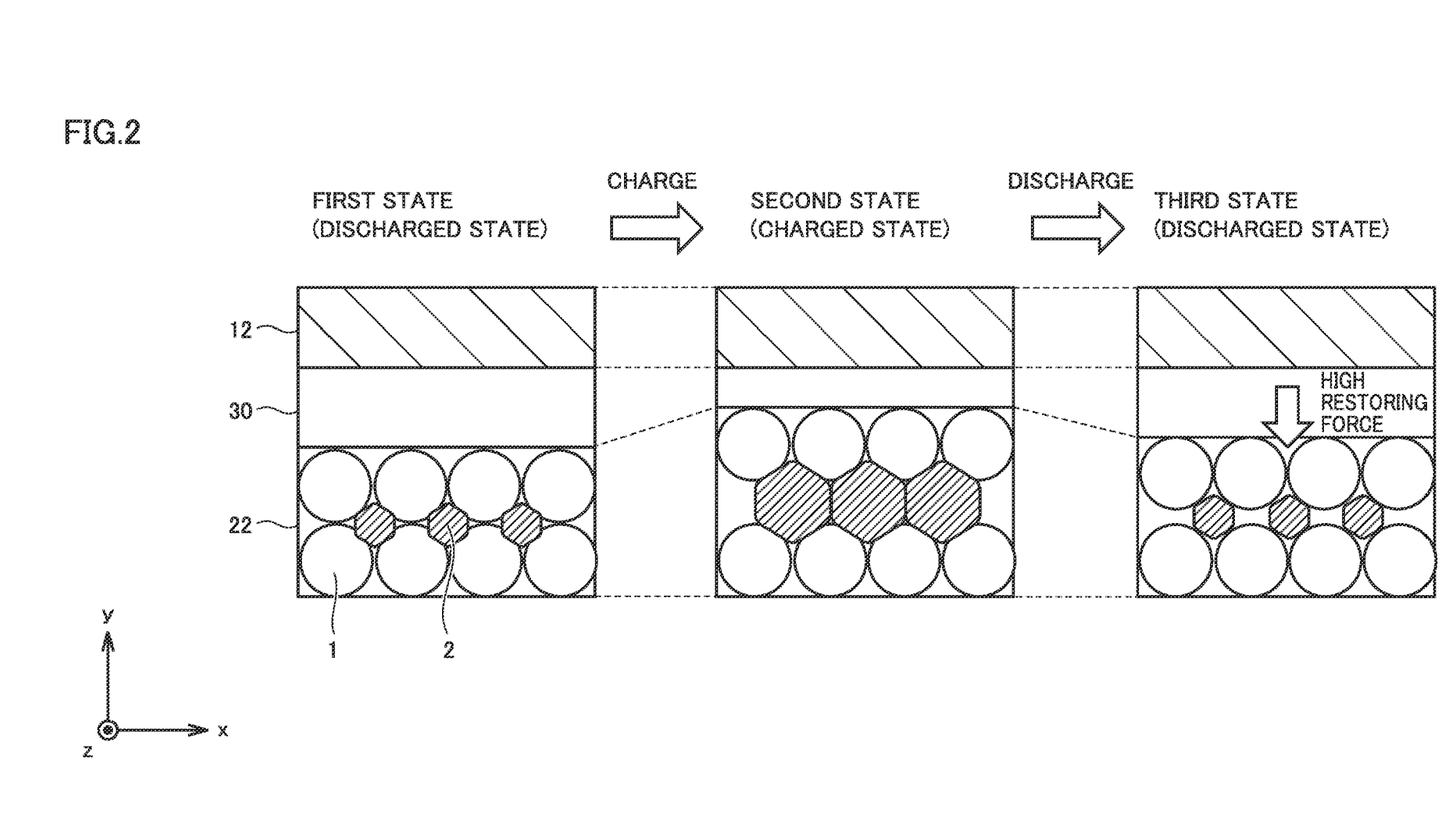
FIG. 2 is a second conceptual view that illustrates the action mechanism according to the present disclosure.

FIG. 2 is a second conceptual view that illustrates the action mechanism according to the present disclosure.

Porous film 30 in FIG. 2 contains at least a ceramic material. By containing a ceramic material, porous film 30 can have a spring constant higher than that of a typical porous film. It is considered that a porous film with a high spring constant is less likely to be deformed by external force. It is also considered that a porous film with a high spring constant exerts a great restoring force when the external force is withdrawn.

In the non-aqueous electrolyte secondary battery according to the present disclosure, the ratio of a spring constant (second spring constant) of porous film 30 to a spring constant (first spring constant) of negative electrode active material layer 22 is higher than 1. In other words, the spring constant of porous film 30 is higher than the spring constant of negative electrode active material layer 22.

A first state in FIG. 2 refers to a discharged state. In the first state, graphite-based carbon material 1 and silicon oxide 2 are in electrical contact with each other. A second state in FIG. 2 refers to a charged state. Charge causes a drastic expansion of silicon oxide 2. It is considered that because porous film 30 is less likely to be deformed, the thickness of negative electrode active material layer 22 does not increase drastically.

A third state in FIG. 2 refers to a discharged state. Discharge causes a drastic shrinkage of silicon oxide 2. It is considered that in the present disclosure, porous film 30 has a great restoring force, and negative electrode active material layer 22 is more likely to be deformed by external force than porous film 30 is. It is considered that because of these properties, porous film 30 pushes negative electrode active material layer 22 back in a thickness direction (the Y-axis direction in FIG. 2). It is considered that because of this phenomenon, the electrical contact between graphite-based carbon material 1 and silicon oxide 2 is likely to be retained.

Thus, according to the present disclosure, the following is expected: in a mixed system containing graphite-based carbon material 1 and silicon oxide 2, the degree of decrease in cycle capacity retention is small even though silicon oxide 2 is contained.

[2] The ratio of the second spring constant to the first spring constant may be not lower than 1.25.

Hereinafter, the ratio of the second spring constant to the first spring constant is also called "spring constant ratio". It is expected that when the spring constant ratio is not lower than 1.25, the degree of decrease in cycle capacity retention is small even though silicon oxide 2 is contained.

[3] The ratio of the second spring constant to the first spring constant may be not lower than 1.60.

It is expected that when the spring constant ratio is not lower than 1.60, the degree of decrease in cycle capacity retention is small even though silicon oxide 2 is contained.

[4] A silicon oxide content in the negative electrode active material layer may be not lower than 2 mass % and not higher than 10 mass % of a total content of the graphite-based carbon material and the silicon oxide.

When the silicon oxide content is within this range, an excellent balance is expected to be obtained between the initial capacity and the cycle capacity retention.

The foregoing and other objects, features, aspects and advantages of the present disclosure will become more apparent from the following detailed description of the present disclosure when taken in conjunction with the accompanying drawings.

DESCRIPTION OF THE EMBODIMENTS

In the following, embodiments according to the present disclosure (herein called "present embodiment") are described. The scope of claims is not limited to the following description. Hereinafter, a non-aqueous electrolyte secondary battery is sometimes abbreviated as "battery".

<Non-Aqueous Electrolyte Secondary Battery>

Figure 3:
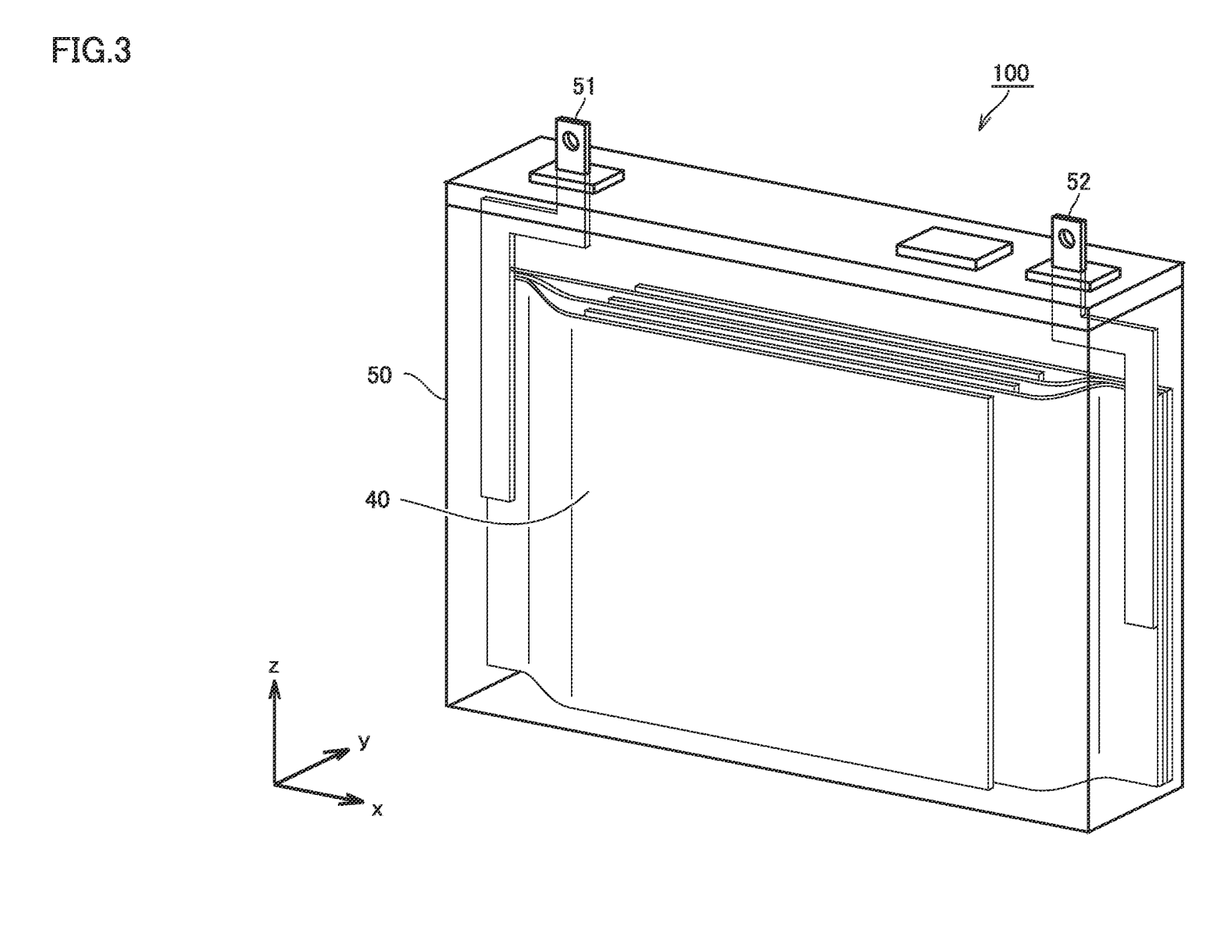
FIG. 3 is a schematic view illustrating the structure of a non-aqueous electrolyte secondary battery according to the present embodiment.

FIG. 3 is a schematic view illustrating the structure of a non-aqueous electrolyte secondary battery according to the present embodiment.

A Battery 100 includes a casing 50. Casing 50 is hermetically sealed. Casing 50 is equipped with a positive electrode terminal 51 and a negative electrode terminal 52. Casing 50 may be made of aluminum (Al) alloy, for example. Casing 50 accommodates an electrode array 40 and an electrolyte solution (not shown).

Casing 50 is prismatic (a flat, rectangular parallelepiped). The shape of casing 50 is not limited to prismatic. Casing 50 may be cylindrical, for example. Casing 50 may be, for example, a pouch made of an Al-laminated film or the like. In other words, battery 100 may be a laminate-type battery. Casing 50 may be equipped with a gas-discharge valve, a liquid inlet, and a current interrupt device (CID), for example.

Figure 4:
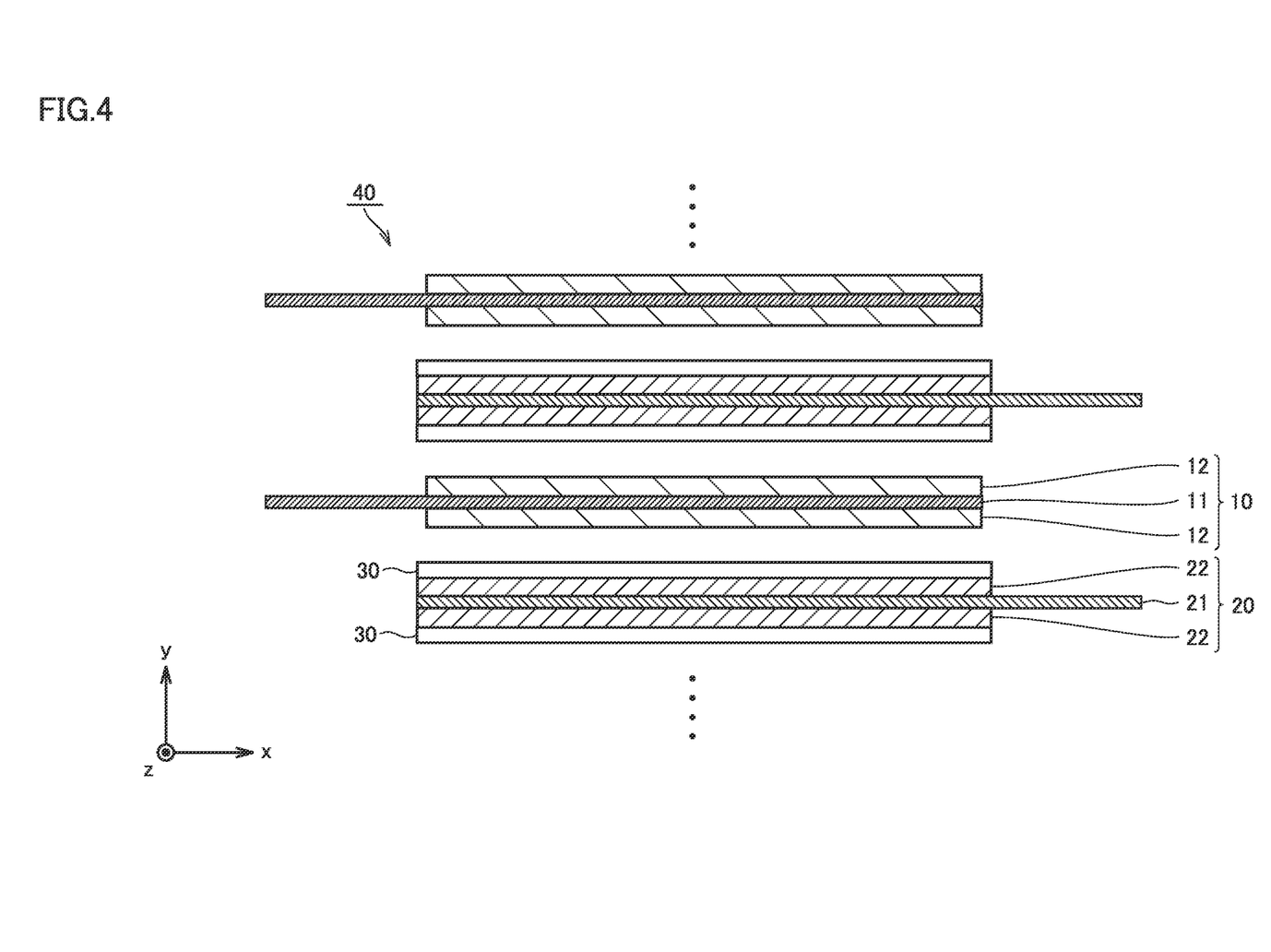
FIG. 4 is a conceptual cross-sectional view illustrating the structure of an electrode array according to the present embodiment.

FIG. 4 is a conceptual cross-sectional view illustrating the structure of an electrode array according to the present embodiment.

Electrode array 40 is a stack-type one. Electrode array 40 is formed by alternately stacking a positive electrode 10 and a negative electrode 20. Positive electrode 10 includes at least a positive electrode active material layer 12. Negative electrode 20 includes at least a negative electrode active material layer 22. In the space between positive electrode active material layer 12 and negative electrode active material layer 22, a porous film 30 is interposed. In other words, battery 100 includes at least positive electrode active material layer 12, porous film 30, and negative electrode active material layer 22.

Electrode array 40 may be a wound-type one. More specifically, electrode array 40 may be formed by stacking positive electrode 10, porous film 30, and negative electrode 20 in this order and then winding them in a spiral fashion. Also in such a wound-type electrode array, porous film 30 is interposed between positive electrode active material layer 12 and negative electrode active material layer 22.

Battery 100 may further include a restraint component (not shown). The restraint component may be at least one metal plate, for example. The restraint component may be placed in such an arrangement that the restraint component applies pressure to casing 50 on, for example, both sides of the casing in the Y-axis direction shown in FIGS. 3 and 4. In this arrangement, negative electrode active material layer 22 receives pressure to both sides thereof in the Y-axis direction. When charge is carried out in this arrangement, it is expected that expansion of negative electrode active material layer 22 is inhibited and the degree of decrease in cycle capacity retention is small.

<<Spring Constant Ratio>>

Negative electrode active material layer 22 has a first spring constant. Porous film 30 has a second spring constant. The ratio of the second spring constant to the first spring constant is higher than 1. Therefore, in the present embodiment, it is considered that the electrical contact between a graphite-based carbon material 1 and a silicon oxide 2 is likely to be retained during charge-discharge cycles. This ratio, which is called spring constant ratio, may be not lower than 1.25. The spring constant ratio may be not lower than 1.60. When the spring constant ratio is within either range, it is expected that the degree of decrease in cycle capacity retention is small. The upper limit to the spring constant ratio is not particularly limited. The spring constant ratio may be not higher than 1.86, for example.

The "first spring constant" is measured by the following procedure.

Negative electrode 20 in a discharged state is prepared. The "discharged state" refers to a state in which the electric potential of negative electrode 20 is not lower than 0.5 V (vs. Li/Li$^+$). The electric potential in unit "V (vs. Li/Li$^+$)" refers to a value of electric potential relative to the standard electric potential of the Li electrode. From negative electrode 20, a specimen is cut in such a way that the specimen includes a rectangular area (5 cm×5 cm) of negative electrode active material layer 22. Fifty specimens of this type are prepared. These fifty specimens are stacked atop one another in a thickness direction. The resulting stack of these fifty specimens is interposed between two stainless steel plates.

A compression tester is prepared. As the compression tester, a precision universal tester "Autograph" manufactured by Shimadzu Corporation or a similar product may be used, for example. Onto the platform of the compression tester, the stack of fifty specimens interposed between the stainless steel plates is placed.

The compression tester is operated to apply a load to the stack of the specimens in the stacking direction. The degree of displacement caused by the load application is measured. On a two-dimensional coordinate system, the degree of displacement (unit, mm) (abscissa) relative to the amount of load (unit, kN) (ordinate) is plotted. Thus, a "load-displacement curve" is obtained. In the resulting load-displacement curve, the slopes of the area of elastic deformation are averaged. The resulting average is multiplied by the number of the specimens (which is 50), and thus the value of spring constant per single specimen (unit, kN/mm) is obtained. In the present embodiment, the resulting "spring constant per single specimen" is defined as the "spring constant of negative electrode active material layer 22".

Negative electrode active material layer 22 may be formed on a surface of a negative electrode current collector 21 (described below). In such a case, the specimen for use in spring constant measurement may be a combination of negative electrode active material layer 22 and negative electrode current collector 21 (integrated piece). It is considered that displacement by load application occurs substantially only in negative electrode active material layer 22. Therefore, it is considered that the spring constant of negative electrode active material layer 22 that is formed on a surface of negative electrode current collector 21 is the same as the spring constant measured by the above procedure.

The "second spring constant" is measured by the following procedure.

In the case in which porous film 30 is a free-standing film, the second spring constant is measured in the same manner as for the measurement of the first spring constant. The "free-standing film" refers to a film that retains its shape on its own.

Alternatively, porous film 30 according to the present embodiment can be a non-free-standing film. The "non-free-standing film" refers to a film that retains its shape by being supported by a supporting component. The supporting component may be negative electrode active material layer 22, for example. By the same measurement procedure as above, a load-displacement curve for a combination of the non-free-standing film and the supporting component (integrated piece) is obtained. Also by the same measurement procedure as above, a load-displacement curve for the supporting component alone is obtained. Displacement attributable to the supporting component is subtracted from the load-displacement curve for a combination of the non-free-standing film and the supporting component. Thus, a load-displacement curve for the non-free-standing film alone is obtained. By the same procedure as above, the value of spring constant per single non-free-standing film is calculated.

<<Negative Electrode>>

Negative electrode 20 includes at least negative electrode active material layer 22. Negative electrode 20 may further include negative electrode current collector 21. Negative electrode current collector 21 may be made of copper (Cu) foil, for example. Negative electrode current collector 21 may have a thickness not smaller than 5 μm and not greater than 30 for example. The thickness of each component herein is measured with a micrometer, for example. The thickness of each component may be measured in, for example, a cross-sectional image observed with a microscope. Thickness measurement is carried out at at least three positions. The arithmetic mean of these at least three measurements is used.

<<Negative Electrode Active Material Layer>>

Negative electrode active material layer 22 has the first spring constant. The first spring constant can be adjusted by changing, for example, the thickness, the density, and/or the composition of negative electrode active material layer 22. In the present embodiment, the first spring constant is adjusted so that the relationship "(first spring constant)< (second spring constant)" is satisfied. The first spring constant may be not higher than 7900 kN/mm, for example. The first spring constant may be not higher than 6400 kN/mm, for example. The first spring constant may be not higher than 5000 kN/mm, for example. The lower limit to the first spring constant is not particularly limited. The first spring constant may be not lower than 4300 kN/mm, for example.

Negative electrode active material layer 22 may be formed on a surface of negative electrode current collector 21, for example. Negative electrode active material layer 22 may be formed on both sides of negative electrode current collector 21. Negative electrode active material layer 22 may have a thickness not smaller than 50 μm and not greater than 250 μm, for example. Negative electrode active material layer 22 may have a thickness not smaller than 150 μm and not greater than 200 μm, for example. Negative electrode active material layer 22 may have a thickness not smaller than 176 μm and not greater than 197 μm, for example.

Negative electrode active material layer 22 may have a density not lower than 1.4 g/cm$^3$ and not higher than 1.6 g/cm$^3$, for example. It is considered that the lower the density is, the lower the first spring constant tends to be. The density of negative electrode active material layer 22 is calculated by dividing the mass of negative electrode active material layer 22 by the apparent volume of negative electrode active material layer 22. The apparent volume refers to a volume calculated from the outer dimensions (thickness× area) of negative electrode active material layer 22. Negative electrode active material layer 22 may have a density not lower than 1.4 g/cm$^3$ and not higher than 1.5 g/cm$^3$, for example.

Negative electrode active material layer 22 contains at least a negative electrode active material. The negative electrode active material is a combination of graphite-based carbon material 1 and silicon oxide 2. In other words, negative electrode active material layer 22 contains at least graphite-based carbon material 1 and silicon oxide 2. Negative electrode active material layer 22 may be a layer substantially consisting of a negative electrode active material. Negative electrode active material layer 22 may further contain a conductive material and a binder, for example, in addition to the negative electrode active material.

(Graphite-Based Carbon Material)

Graphite-based carbon material 1 refers to a carbon material that includes a graphite crystal structure or a crystal structure similar to a graphite crystal structure. The graphite crystal structure or the crystal structure similar to a graphite crystal structure refers to a crystal structure consisting of carbon hexagonal net planes stacked atop one another. Graphite-based carbon material 1 may be graphite, soft carbon, and/or hard carbon, for example. The graphite may be natural graphite. The graphite may be artificial graphite. One type of graphite-based carbon material 1 may be used alone. Two or more types of graphite-based carbon material 1 may be used in combination.

As long as graphite-based carbon material 1 includes a graphite crystal structure or a crystal structure similar to a graphite crystal structure, the graphite-based carbon material may also contain, for example, an amorphous carbon material. For example, graphite (particles) coated with an amorphous carbon material on the surface may be used.

Graphite-based carbon material 1 is typically in a particulate form. Graphite-based carbon material 1 may have a D50 not lower than 1 μm and not higher than 30 μm, for example. The "D50" herein is measured by laser diffraction and scattering and refers to the particle size in volume-based particle size distribution at which the cumulative particle volume (accumulated from the side of small sizes) reaches 50% of the total particle volume. Graphite-based carbon material 1 may have a D50 not lower than 10 μm and not higher than 20 μm, for example.

(Silicon Oxide)

Silicon oxide 2 is a compound that contains silicon (Si) and oxygen (O). Silicon oxide 2 may be a compound substantially consisting of silicon and oxygen. Silicon oxide 2 may further contain an element other than silicon or oxygen. For example, silicon oxide 2 may contain a trace amount of an element that is inevitably entrapped during production. For example, a coating of an element (such as carbon) other than silicon or oxygen may be formed on a surface of silicon oxide 2.

The ratio of silicon atom to oxygen atom in silicon oxide 2 may be any conventionally known ratio. For example, silicon oxide 2 may have the following compositional formula:

$$SiO_x$$

(where, x satisfies 0<x<2).

In the above compositional formula, x may satisfy $0.5 \leq x \leq 1.5$, or x may satisfy $1 \leq x \leq 1.5$. When x satisfies either relationship, an improved balance can be obtained between the initial capacity and the cycle capacity retention.

Silicon oxide 2 is typically in a particulate form. For example, silicon oxide 2 may have a D50 lower than the D50 of graphite-based carbon material 1. When the silicon oxide has such a D50, the filling factor of negative electrode active material layer 22 can be improved. Silicon oxide 2 may have a D50 not lower than 1 μm and not higher than 20 μm, for example. Silicon oxide 2 may have a D50 not lower than 1 μm and lower than 10 μm, for example.

The content of silicon oxide 2 in negative electrode active material layer 22 may be not lower than 2 mass % and not higher than 10 mass % of the total content of graphite-based carbon material 1 and silicon oxide 2. When the content is within this range, an excellent balance is expected to be obtained between the initial capacity and the cycle capacity retention. The higher the content of silicon oxide 2 is, the higher the first spring constant tends to be. The higher the content of silicon oxide 2 is, the higher the initial capacity tends to be. For example, the content of silicon oxide 2 may be not lower than 3 mass % and not higher than 7 mass % of the total content of graphite-based carbon material 1 and silicon oxide 2. When the content is within this range, an improved balance is expected to be obtained between the initial capacity and the cycle capacity retention.

(Other Components)

Negative electrode active material layer 22 may further contain a conductive material. The content of the conductive material in negative electrode active material layer 22 may be, for example, not lower than 1 part by mass and not higher than 10 parts by mass relative to 100 parts by mass of the negative electrode active material. The conductive material is not particularly limited. The conductive material may be a carbon black (such as acetylene black) or carbon fiber, for example. One type of the conductive material may be used alone. Two or more types of the conductive material may be used in combination.

Negative electrode active material layer 22 may further contain a binder. The content of the binder in negative electrode active material layer 22 may be, for example, not lower than 1 part by mass and not higher than 10 parts by mass relative to 100 parts by mass of the negative electrode active material. The binder is not particularly limited. The binder may be carboxymethylcellulose (CMC), styrene-butadiene rubber (SBR), polytetrafluoroethylene (PTFE), polyacrylic acid (PAA), polyacrylic acid ester, polymethacrylic acid ester, and/or polyacrylonitrile (PAN), for example. One type of the binder may be used alone. Two or more types of the binder may be used in combination.

<<Porous Film>>

Porous film 30 has the second spring constant. The second spring constant can be adjusted by changing, for example, the thickness, the porosity, and/or the composition of porous film 30. In the present embodiment, the second spring constant is adjusted so that the relationship "(first spring constant)<(second spring constant)" is satisfied. The second spring constant may be not lower than 8000 kN/mm, for example. The upper limit to the second spring constant is not particularly limited. The second spring constant may be not higher than 16000 kN/mm, for example.

Porous film 30 is interposed between positive electrode 10 and negative electrode 20. By the presence of porous film 30, positive electrode 10 and negative electrode 20 are separated from each other. Porous film 30 may be a free-standing film. The free-standing film may be a formed article (a green sheet) containing a ceramic material, for example.

Porous film 30 may be a non-free-standing film. For example, porous film 30 may be formed on a surface of positive electrode active material layer 12. For example, porous film 30 may be formed on a surface of negative electrode active material layer 22. Porous film 30 may be formed on a surface of negative electrode active material layer 22 by, for example, coating a surface of negative electrode active material layer 22 with a slurry containing a ceramic material and then carrying out drying.

When porous film 30 is formed on a surface of negative electrode active material layer 22, it is expected that the degree of decrease in cycle capacity retention is small. It is considered that this phenomenon occurs because the restoring force of porous film 30 is readily transmitted to negative electrode active material layer 22.

Porous film 30 may have a thickness not smaller than 10 μm and not greater than 50 μm, for example. Porous film 30 may have a thickness not smaller than 20 μm and not greater than 40 µm, for example. Porous film 30 may have a thickness not smaller than 20 µm and not greater than 30 µm, for example.

Porous film 30 allows an electrolyte solution to pass therethrough. The higher the porosity of porous film 30 is, the higher the output tends to be. The higher the porosity of porous film 30 is, the lower the second spring constant tends to be. Porous film 30 may have a porosity not lower than 30% and not higher than 60%, for example. The porosity is measured by mercury porosimetry, for example. The porosity is measured at least three times. The arithmetic mean of these at least three measurements is used.

Porous film 30 contains at least a ceramic material. Porous film 30 may be a film substantially consisting of the ceramic material. Porous film 30 may further contain a polymer material as a binder. For example, porous film 30 may contain the ceramic material in an amount not lower than 70 mass % and not higher than 99 mass %, with the remainder being made up of the binder. In the case in which porous film 30 contains a material other than the ceramic material, it is desirable that the ceramic material is contained throughout porous film 30.

The ceramic material is typically in a particulate form. The ceramic material may have a D50 not lower than 0.1 µm and not higher than 10 µm, for example. The ceramic material is not particularly limited. The ceramic material may be a metal oxide, for example. The ceramic material may be alumina, boehmite, titania, magnesia, and/or zirconia, for example. One type of the ceramic material may be used alone. Two or more types of the ceramic material may be used in combination.

The binder is not particularly limited. For example, the binder may be polyvinylidene difluoride (PVdF), vinylidene fluoride-hexafluoropropene copolymer (PVdF-HFP), CMC, SBR, PTFE, polyacrylic acid ester, polymethacrylic acid ester, PAN, and/or polyimide. One type of the binder may be used alone. Two or more types of the binder may be used in combination.

<<Positive Electrode>>

Positive electrode 10 includes at least positive electrode active material layer 12. Positive electrode 10 may further include a positive electrode current collector 11. Positive electrode current collector 11 may be made of Al foil, for example. Positive electrode current collector 11 may have a thickness not smaller than 5 µm and not greater than 30 µm, for example.

<<Positive Electrode Active Material Layer>>

Positive electrode active material layer 12 has a third spring constant. The third spring constant is measured in the same manner as for the above measurement of the first spring constant, for example. The third spring constant can be adjusted by changing, for example, the thickness, the density, and/or the composition of positive electrode active material layer 12. In the present embodiment, the third spring constant may be adjusted so that the following relationship, for example, is satisfied: "(first spring constant (negative electrode active material layer 22))<(second spring constant (porous film 30))<(third spring constant (positive electrode active material layer 12))". When this relationship or the like is satisfied, it is expected that the degree of decrease in cycle capacity retention is small. It is considered that this phenomenon occurs because the restoring force of porous film 30 is readily transmitted to negative electrode active material layer 22. The third spring constant may be not lower than 10000 kN/mm and not higher than 20000 kN/mm, for example.

Positive electrode active material layer 12 may be formed on a surface of positive electrode current collector 11, for example. Positive electrode active material layer 12 may be formed on both sides of positive electrode current collector 11. Positive electrode active material layer 12 may have a thickness not smaller than 50 µm and not greater than 250 for example. Positive electrode active material layer 12 may have a thickness not smaller than 100 µm and not greater than 200 µm, for example.

Positive electrode active material layer 12 may have a density not lower than 3.0 g/cm³ and not higher than 4.0 g/cm³, for example. The density of positive electrode active material layer 12 is calculated in the same manner as for the measurement of the density of negative electrode active material layer 22. Positive electrode active material layer 12 may have a density not lower than 3.0 g/cm³ and not higher than 3.5 g/cm³, for example.

Positive electrode active material layer 12 contains at least a positive electrode active material. Positive electrode active material layer 12 may further contain a conductive material and a binder. The positive electrode active material is typically in a particulate form. The positive electrode active material may have a D50 not lower than 1 µm and not higher than 30 µm, for example.

The positive electrode active material is not particularly limited. The positive electrode active material may be $LiCoO_2$, $LiNiO_2$, $LiMnO_2$, $LiMn_2O_4$, $LiNi_{1/3}Co_{1/3}Mn_{1/3}O_2$, $LiNi_{0.82}Co_{0.15}Al_{0.03}O_2$, and/or $LiFePO_4$, for example. One type of the positive electrode active material may be used alone. Two or more types of the positive electrode active material may be used in combination.

The content of the conductive material in positive electrode active material layer 12 may be, for example, not lower than 1 part by mass and not higher than 10 parts by mass relative to 100 parts by mass of the positive electrode active material. The conductive material is not particularly limited. The conductive material may be acetylene black (AB), for example. The content of the binder in positive electrode active material layer 12 may be, for example, not lower than 1 part by mass and not higher than 10 parts by mass relative to 100 parts by mass of the positive electrode active material. The binder is not particularly limited either. The binder may be PVdF, for example.

<<Electrolyte Solution>>

Battery 100 includes an electrolyte solution. The electrolyte solution contains a solvent and a supporting salt. The electrolyte solution may contain the supporting salt in an amount not lower than 0.5 mol/l and not higher than 2 enol/l, for example. The supporting salt may be $LiPF_6$, $LiBF_4$, $Li[N(FSO_2)_2]$, and/or $Li[N(CF_3SO_2)_2]$, for example. One type of the supporting salt may be used alone. Two or more types of the supporting salt may be used in combination.

The solvent may be a mixture of a cyclic carbonate and a chain carbonate, for example. The mixing ratio may be "(cyclic carbonate)/(chain carbonate)=1/9 to 5/5 (volume ratio)", for example. The cyclic carbonate may be ethylene carbonate (EC), propylene carbonate (PC), butylene carbonate (BC), and/or fluoroethylene carbonate (FEC), for example. One type of the cyclic carbonate may be used alone. Two or more types of the cyclic carbonate may be used in combination.

The chain carbonate may be dimethyl carbonate (DMC), ethyl methyl carbonate (EMC), and/or diethyl carbonate (DEC), for example. One type of the chain carbonate may be used alone. Two or more types of the chain carbonate may be used in combination.

The solvent may include a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various additives in addition to the solvent and the supporting salt. The electrolyte solution may contain the additive or additives in an amount not lower than 0.005 mol/l and not higher than 0.5 mol/l, for example. Examples of the additives include a gas generation agent (anti-overcharging additive) and a solid electrolyte interface (SEI) film-forming agent. The gas generation agent may be cyclohexylbenzene (CHB) or biphenyl (BP), for example. The SEI film-forming agent may be vinylene carbonate (VC), vinylethylene carbonate (VEC), $Li[B(C_2O_4)_2]$, $LiPO_2F_2$, propane sultone (PS), or ethylene sulfite (ES), for example. One type of the additives may be used alone. Two or more types of the additives may be used in combination.

EXAMPLES

In the following, examples according to the present disclosure are described. The scope of claims is not limited to the following description.

Example 1

1. Production of Positive Electrode

The following materials were prepared.
Positive electrode active material: $LiNi_{0.82}Co_{0.15}Al_{0.03}O_2$ (D50=10 μm)
Conductive Material: AB
Binder: PVdF
Positive electrode current collector 11: Al foil (thickness=15 μm)
Solvent: N-methyl-2-pyrrolidone (NMP)

The positive electrode active material, the conductive material, the binder, and the solvent were mixed to prepare slurry. The mixing ratio of the solid contents was "(positive electrode active material)/(conductive material)/binder=95/2/3 (mass ratio)". The resulting slurry was applied to the surface (both sides) of positive electrode current collector 11 and then dried to form positive electrode active material layer 12. Positive electrode active material layer 12 was compressed. Positive electrode active material layer 12 after compression had a density of 3.4 g/cm³. Thus, positive electrode 10 was produced.

2. Production of Negative Electrode

The following materials were prepared.
Graphite-based carbon material 1: graphite (D50=15 μm)
Silicon oxide 2: SiO (D50=5 μm)
Binder: CMC and SBR
Solvent: water
Negative electrode current collector 21: Cu foil (thickness=10 μm)

The negative electrode active material, the binder, and the solvent were mixed to prepare slurry. The mixing ratio of the solid contents was "(negative electrode active material)/binder=98/2 (mass ratio)". The ratio of silicon oxide 2 to the total of graphite-based carbon material 1 and silicon oxide 2 was 2 mass %. The amount of CMC used was the same as that of SBR used. The resulting slurry was applied to the surface (both sides) of negative electrode current collector 21 and then dried to form negative electrode active material layer 22. Negative electrode active material layer 22 was compressed. Negative electrode active material layer 22 after compression had a density of 1.5 g/cm³.

3. Formation of Porous Film

The following materials were prepared.
Ceramic material: alumina (D50=0.7 van)
Binder: PVdF
Solvent: NMP The ceramic material, the binder, and the solvent were mixed to prepare slurry. The mixing ratio of the solid contents was "(ceramic material)/binder=90/10 (mass ratio)". The resulting slurry was applied to the surface of negative electrode active material layer 22 and then dried to form porous film 30. Porous film 30 had a thickness of 25 μm.

4. Assembling

Negative electrode 20, which had porous film 30 formed on its surface, and positive electrode 10 were alternately stacked to form electrode array 40. In electrode array 40, porous film 30 was interposed between positive electrode active material layer 12 and negative electrode active material layer 22. Electrode array 40 was placed in casing 50. Electrode array 40 was connected to positive electrode terminal 51 and negative electrode terminal 52.

An electrolyte solution was prepared. The electrolyte solution contained a solvent and a supporting salt specified below.
Solvent: [EC/EMC/DMC=1/1/1 (volume ratio)]
Supporting salt: $LiPF_6$ (1 mol/l)

The electrolyte solution was injected into casing 50. Casing 50 was hermetically sealed. Thus, battery 100 was assembled. A restraint component was attached to battery 100 such that battery 100 received pressure on both sides thereof in the Y-axis direction in FIG. 3. The restraint component was stainless steel plates. The pressure applied was 1 MPa.

5. Measurement of Initial Capacity

Under an environment at a temperature of 25° C., battery 100 was charged to 4.2 V at a rate of C/5. The rate "C/5" is such a rate at which discharge of battery 100 from full charge capacity completes in 5 hours. After the charge, battery 100 was left as it was for 10 hours under an environment at a temperature of 60° C. Subsequently, battery 100 was discharged to 2.5 V at a rate of C/5 under an environment at a temperature of 25° C.

The initial capacity (initial discharged capacity) was measured by carrying out constant current constant voltage mode charging (CCCV charging) and constant current mode discharging (CC discharging) described below. Results are shown in Table 1 below.

CCCV Charging: rate in constant-current charging=C/5, voltage in constant-voltage charging=4.2 V
CC Discharging: rate=C/5, cut-off voltage=2.5 V

Examples 2 to 5

Battery 100 was produced in the same manner as in Example 1 except that the content of silicon oxide 2 (SiO) was changed as specified in Table 1 below.

Examples 6 and 7

Battery 100 was produced in the same manner as in Example 5 except that the density of negative electrode active material layer 22 was changed as specified in Table 1 below.

Comparative Example 1

As a porous film, a polymer-material porous film (free-standing film) was prepared. The porous film had a thickness of 25 μm. The porous film had a three-layer structure. More specifically, the porous film was formed by stacking a polypropylene (PP) porous film, a polyethylene (PE) porous film, and a polypropylene (PP) porous film in this order. In Table 1 below, the structure of the polymer-material porous film is expressed as "PP/PE/PP".

Positive electrode 10 and negative electrode 20 were alternately stacked to form electrode array 40. In the space between positive electrode 10 and negative electrode 20, the polymer-material porous film was interposed. Except for this configuration, the same manner as in Example 1 was adopted and battery 100 was produced.

active material layer 22) and the second spring constant (the spring constant of porous film 30) were measured. Results are shown in Table 1 below.

2. Measurement of Cycle Capacity Retention

Charge-discharge cycles were repeated 100 times (100 cycles). In a single cycle, a single set of CCCV charging and CC discharging described below was carried out.

CCCV Charging: rate in constant-current charging=C/5, voltage in constant-voltage charging=4.2 V CC Discharging: rate=C/5, cut-off voltage=2.5 V After 100 cycles, a post-cycle capacity was measured under the same conditions as those in the initial capacity measurement. The resulting post-cycle capacity was divided by the initial capacity, and thus a cycle capacity retention was obtained. Results are shown in Table 1 below.

TABLE 1

List of Examples and Comparative Examples

| | Negative electrode active material layer | | | | | Porous film | | Spring | Evaluation | |
|---|---|---|---|---|---|---|---|---|---|---|
| | Negative electrode active material | | | | 1st spring | | | 2nd spring | | Cycle |
| | Graphite cont. mass % | SiO cont. mass % | Thickness μm | Density g/cm³ | constant (A) kN/mm | Structure | Thickness μm | constant (B) kN/mm | ratio (B/A) — | Initial capacity Ah | capacity retention % |
| Comp. Ex. 1 | 98 | 2 | 197 | 1.5 | 4300 | PP/PE/PP | 25 | 3500 | 0.81 | 38.9 | 95 |
| Comp. Ex. 2 | 97 | 3 | 194 | 1.5 | 4400 | PP/PE/PP | 25 | 3500 | 0.80 | 39.2 | 94 |
| Comp. Ex. 3 | 95 | 5 | 189 | 1.5 | 4700 | PP/PE/PP | 25 | 3500 | 0.74 | 40.1 | 89 |
| Comp. Ex. 4 | 93 | 7 | 183 | 1.5 | 5000 | PP/PE/PP | 25 | 3500 | 0.70 | 41.1 | 85 |
| Comp. Ex. 5 | 90 | 10 | 176 | 1.5 | 7000 | PP/PE/PP | 25 | 3500 | 0.50 | 42.3 | 65 |
| Comp. Ex. 6 | 88 | 12 | 165 | 1.5 | 10400 | PP/PE/PP | 25 | 3500 | 0.34 | 43.9 | 45 |
| Ex. 1 | 98 | 2 | 197 | 1.5 | 4300 | Alumina + PVdF | 25 | 8000 | 1.86 | 38.9 | 98 |
| Ex. 2 | 97 | 3 | 194 | 1.5 | 4400 | Alumina + PVdF | 25 | 8000 | 1.82 | 39.2 | 97 |
| Ex. 3 | 95 | 5 | 189 | 1.5 | 4700 | Alumina + PVdF | 25 | 8000 | 1.70 | 40.1 | 96 |
| Ex. 4 | 93 | 7 | 183 | 1.5 | 5000 | Alumina + PVdF | 25 | 8000 | 1.60 | 41.1 | 94 |
| Ex. 5 | 90 | 10 | 176 | 1.5 | 7000 | Alumina + PVdF | 25 | 8000 | 1.14 | 42.3 | 91 |
| Comp. Ex. 7 | 88 | 12 | 165 | 1.5 | 10400 | Alumina + PVdF | 25 | 8000 | 0.77 | 43.9 | 75 |
| Ex. 6 | 90 | 10 | 182 | 1.4 | 6400 | Alumina + PVdF | 25 | 8000 | 1.25 | 40.9 | 93 |
| Ex. 7 | 90 | 10 | 170 | 1.6 | 7900 | Alumina + PVdF | 25 | 8000 | 1.01 | 43.7 | 90 |
| Comp. Ex. 8 | 90 | 10 | 165 | 1.7 | 9200 | Alumina + PVdF | 25 | 8000 | 0.87 | 44.9 | 76 |

Comparative Examples 2 to 6

Battery 100 was produced in the same manner as in Comparative Example 1 except that the content of silicon oxide 2 was changed as specified in Table 1 below.

Comparative Example 7

Battery 100 was produced in the same manner as in Example 1 except that the content of silicon oxide 2 was changed as specified in Table 1 below.

Comparative Example 8

Battery 100 was produced in the same manner as in Example 5 except that the density of negative electrode active material layer 22 was changed as specified in Table 1 below.

<Evaluation>

1. Measurement of Spring Constant

By the measurement procedure described above, the first spring constant (the spring constant of negative electrode <Results>

In Comparative Examples 1 to 6, the spring constant (second spring constant) of porous film 30 is lower than the spring constant (first spring constant) of negative electrode active material layer 22. In Comparative Examples 1 to 6, a tendency is observed that the degree of decrease in cycle capacity retention becomes greater as the content of silicon oxide 2 increases. The reason is considered to be that the degree of shrinkage of negative electrode active material layer 22 during discharge is small compared to the degree of expansion of negative electrode active material layer 22 during charge and therefore as more charge-discharge cycles are repeated, the electrical contact between graphite-based carbon material 1 and silicon oxide 2 is lost.

The content of silicon oxide 2 in Example 1 is the same as the content of silicon oxide 2 in Comparative Example 1. However, the cycle capacity retention in Example 1 is higher than that in Comparative Example 1. In other words, it is considered that the degree of decrease in cycle capacity retention in Example 1, compared to Comparative Example 1, is small even though silicon oxide 2 is contained. The same tendency is observed in the comparison between Example 2 and Comparative Example 2, between Example 3 and Comparative Example 3, between Example 4 and Comparative Example 4, and between Example 5 and Comparative Example 5.

It is considered that in the examples, because the spring constant (second spring constant) of porous film 30 is higher than the spring constant (first spring constant) of negative electrode active material layer 22, the degree of shrinkage of negative electrode active material layer 22 during discharge is great. This is considered to be the reason why the electrical contact between graphite-based carbon material 1 and silicon oxide 2 is likely to be retained in the examples.

The content of silicon oxide 2 in Comparative Example 7 is the same as that in Comparative Example 6. The cycle capacity retention in Comparative Example 7 is higher than that in Comparative Example 6. The reason is considered to be that the second spring constant in Comparative Example 7 is higher than the second spring constant in Comparative Example 6. However, the degree of decrease in cycle capacity retention in Comparative Example 7 is greater than those in the examples. From these results, it is considered that it is not enough for porous film 30 to have a high spring constant (second spring constant) but it is necessary for the porous film to have a spring constant (second spring constant) that is higher than the spring constant (first spring constant) of negative electrode active material layer 22.

In Examples 5 to 7 and Comparative Example 8, the values of density of negative electrode active material layer 22 are different from each other. The degree of decrease in cycle capacity retention is remarkably great when the spring constant (first spring constant) of negative electrode active material layer 22 is higher than the spring constant (second spring constant) of porous film 30.

A tendency is observed that the degree of decrease in cycle capacity retention is small when the spring constant ratio is not lower than 1.25.

A tendency is observed that the degree of decrease in cycle capacity retention is small when the spring constant ratio is not lower than 1.60.

A tendency is observed that when the content of silicon oxide 2 is not lower than 2 mass % and not higher than 10 mass %, a good balance is obtained between the initial capacity and the cycle capacity retention. A tendency is observed that when the content of silicon oxide 2 is not lower than 3 mass % and not higher than 7 mass %, an improved balance is obtained between the initial capacity and the cycle capacity retention.

The embodiments and examples disclosed herein are illustrative and non-restrictive in any respect. The technical scope indicated by the claims is intended to include any modifications within the scope and meaning equivalent to the terms of the claims.

What is claimed is:

1. A non-aqueous electrolyte secondary battery, comprising
   at least a positive electrode active material layer,
   a porous film, and
   a negative electrode active material layer,
   the negative electrode active material layer containing at least a graphite-based carbon material and silicon oxide,
   the porous film being interposed between the positive electrode active material layer and the negative electrode active material layer, the porous film containing at least a ceramic material in an amount not lower than 90 mass % and not higher than 99 mass % based on the total weight of the porous film, with the remainder being made up of a binder,
   the negative electrode active material layer having a first spring constant from 4300 kN/mm to 7900 kN/mm,
   the porous film having a second spring constant from 8000 kN/mm to 16000 kN/mm, and
   a ratio of the second spring constant to the first spring constant being higher than 1.

2. The non-aqueous electrolyte secondary battery according to claim 1, wherein the ratio of the second spring constant to the first spring constant is not lower than 1.25.

3. The non-aqueous electrolyte secondary battery according to claim 2, wherein the ratio of the second spring constant to the first spring constant is not lower than 1.60.

4. The non-aqueous electrolyte secondary battery according to claim 1, wherein a content of the silicon oxide in the negative electrode active material layer is not lower than 2 mass % and not higher than 10 mass % of a total content of the graphite-based carbon material and the silicon oxide.

5. The non-aqueous electrolyte secondary battery according to claim 1, wherein the ceramic material is contained throughout the porous film.

6. The non-aqueous electrolyte secondary battery according to claim 1, wherein the ratio of the second spring constant to the first spring constant is higher than 1 and not higher than 1.86.

7. The non-aqueous electrolyte secondary battery according to claim 1, wherein the porous film has a porosity of not lower than 30% and not higher than 60%.

8. The non-aqueous electrolyte secondary battery according to claim 1, wherein the porous film has a thickness of not smaller than 10 μm and not greater than 50 μm.

9. The non-aqueous electrolyte secondary battery according to claim 8, wherein the porous film has a porosity of not lower than 30% and not higher than 60%.

10. A non-aqueous electrolyte secondary battery, comprising
    at least a positive electrode active material layer,
    a porous film, and
    a negative electrode active material layer,
    the negative electrode active material layer containing at least a graphite-based carbon material and silicon oxide,
    the porous film being interposed between the positive electrode active material layer and the negative electrode active material layer, the porous film containing at least a ceramic material in an amount not lower than 70 mass % and not higher than 99 mass % based on the total weight of the porous film, with the remainder being made up of a binder, the porous film having a porosity of not lower than 30% and not higher than 60%, the porous film having a thickness of not smaller than 10 μm and not greater than 50 μm,
    the negative electrode active material layer having a first spring constant from 4300 kN/mm to 7900 kN/mm,
    the porous film having a second spring constant from 8000 kN/mm to 16000 kN/mm, and a ratio of the second spring constant to the first spring constant being higher than 1.

11. The non-aqueous electrolyte secondary battery according to claim 10, wherein the ratio of the second spring constant to the first spring constant is not lower than 1.25.

12. The non-aqueous electrolyte secondary battery according to claim 11, wherein the ratio of the second spring constant to the first spring constant is not lower than 1.60.

13. The non-aqueous electrolyte secondary battery according to claim 10, wherein a content of the silicon oxide in the negative electrode active material layer is not lower than 2 mass % and not higher than 10 mass % of a total content of the graphite-based carbon material and the silicon oxide.

14. The non-aqueous electrolyte secondary battery according to claim 10, wherein the ceramic material is contained throughout the porous film.

15. The non-aqueous electrolyte secondary battery according to claim 10, wherein the ratio of the second spring constant to the first spring constant is higher than 1 and not higher than 1.86.

* * * * *